US012776444B2

(12) United States Patent
Hagiwara et al.

(10) Patent No.: US 12,776,444 B2
(45) Date of Patent: Oct. 27, 2026

(54) METHOD OF MANUFACTURING COIL COMPONENT

(71) Applicant: TAIYO YUDEN CO., LTD., Tokyo (JP)

(72) Inventors: Tomoya Hagiwara, Tokyo (JP); Tatsuya Tomita, Tokyo (JP); Takashi Nakajima, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 277 days.

(21) Appl. No.: 18/497,370

(22) Filed: Oct. 30, 2023

(65) Prior Publication Data

US 2024/0145166 A1 May 2, 2024

(30) Foreign Application Priority Data

Oct. 31, 2022 (JP) ................................ 2022-174376

(51) Int. Cl.
*H01F 41/02* (2006.01)
*B22F 3/02* (2006.01)
*B22F 3/24* (2006.01)

(52) U.S. Cl.
CPC ............ *H01F 41/0246* (2013.01); *B22F 3/02* (2013.01); *B22F 3/24* (2013.01); *B22F 2003/248* (2013.01);
(Continued)

(58) Field of Classification Search
CPC .... H01F 41/0246; H01F 17/0013; H01F 1/24; H01F 1/33; B22F 3/02; B22F 3/24;
(Continued)

(56) References Cited

U.S. PATENT DOCUMENTS

2016/0293308 A1 10/2016 Ryu et al.
2017/0025214 A1 1/2017 Nishimura et al.
(Continued)

FOREIGN PATENT DOCUMENTS

JP 2016-195152 A 11/2016
JP 2021-158261 A 10/2021
WO 2015/137493 A1 9/2015

OTHER PUBLICATIONS

Notice of Reasons for Refusal dated Jun. 30, 2026, issued in corresponding Japanese Patent Application No. 2022-174376, with English machine translation (11 pgs.).

*Primary Examiner* — Ricardo D Morales
(74) *Attorney, Agent, or Firm* — CUSHMAN PARTNERS, LLC

(57) ABSTRACT

One object is to manufacture a magnetic base body containing soft magnetic metal particles with a high content percentage of Fe. A manufacturing method of a magnetic base body according to one embodiment includes: producing a molded body containing a plurality of soft magnetic metal particles at a filling factor of 85% or higher, each of the plurality of soft magnetic metal particles containing Fe and an element A more apt to oxidation than Fe; and heating the molded body to form an insulating film on a surface of each of the plurality of soft magnetic metal particles, the insulating film containing an oxide of Fe and an oxide of the element A. A content percentage of Fe in the plurality of soft magnetic metal particles after the heating is higher than a content percentage of Fe in the plurality of soft magnetic metal particles before the heating.

14 Claims, 7 Drawing Sheets

(52) U.S. Cl.
CPC ....... *B22F 2301/35* (2013.01); *B22F 2998/10* (2013.01)

(58) Field of Classification Search
CPC ............ B22F 2003/248; B22F 2301/35; B22F 2998/10; C22C 33/0264; C22C 2202/02; C22C 33/02
See application file for complete search history.

(56) References Cited

U.S. PATENT DOCUMENTS

| | | | | |
|---|---|---|---|---|
| 2017/0148554 | A1* | 5/2017 | Kudo | H01F 27/24 |
| 2019/0051445 | A1* | 2/2019 | Wada | H01F 1/34 |
| 2021/0313100 | A1 | 10/2021 | Ishida et al. | |

* cited by examiner

METHOD OF MANUFACTURING COIL COMPONENT

CROSS-REFERENCE TO RELATED APPLICATIONS

This application is based on and claims the benefit of priority from Japanese Patent Application Serial No. 2022-174376 (filed on Oct. 31, 2022), the contents of which are hereby incorporated by reference in its entirety.

TECHNICAL FIELD

The present invention relates to a method of manufacturing a magnetic base body.

BACKGROUND

Some coil components include a soft magnetic base body containing a plurality of soft magnetic metal particles made of a soft magnetic material. In the soft magnetic base body, the surfaces of the soft magnetic metal particles are covered with insulating films, and adjacent soft magnetic metal particles are bonded to each other via the insulating films. Since the soft magnetic base body is less prone to magnetic saturation than a magnetic base body made of ferrite, the soft magnetic base body is suitable particularly for coil components used in large-current circuits.

The soft magnetic metal particles are made of a soft magnetic material mainly composed of Fe, for example. The raw powder used to fabricate the Fe-based soft magnetic metal particles mainly composed of Fe further contains additive elements such as Si, Cr, and Al in addition to Fe to improve magnetic and insulating properties.

The magnetic base body is fabricated by mixing raw powder made of a soft magnetic material with a resin to produce a mixed resin composition, and then heating the mixed resin composition. During the heat treatment, the additive elements (e.g., Si, Cr, Al) contained in the raw powder particles move to the surfaces of the raw powder particles and are oxidized. Also, Fe atoms contained in the raw powder are also oxidized. Thus, an insulating oxide film containing oxides of the elements of the raw powder is formed on the surfaces of the soft magnetic metal particles. This oxide film electrically insulates the adjacent soft magnetic metal particles from each other.

The magnetic base body disclosed in Japanese Patent Application Publication No. 2021-158261 ("the '261 Publication") has an insulating film formed of four oxide layers stacked on the surfaces of the soft magnetic metal particles, so as to improve the voltage resistance between the soft magnetic metal particles.

In a conventional magnetic base body, the insulating film provided on the surfaces of the soft magnetic metal particles includes an oxide layer composed mainly of Fe oxide. The Fe oxide is produced by oxidation of Fe contained in the raw powder. In a conventional magnetic base body, the surfaces of the soft magnetic metal particles are covered by a layered Fe oxide layer, and this Fe oxide layer ensures insulation between the soft magnetic metal particles. According to FIG. 3 of the '261 Publication, the count of Fe element in the second and fourth oxide layers containing Fe oxide is about half of the count of Fe element in the interior of the soft magnetic metal particle (the position at zero on the horizontal axis), which indicates that in the magnetic base body of the '261 Publication, the second and fourth oxide layers contain a large amount of Fe oxide formed from the raw powder.

In a conventional magnetic base body, the insulating film surrounding the soft magnetic metal particles contains a large amount of Fe oxide formed from Fe contained in the raw powder, so the content percentage of Fe in the soft magnetic metal particles is lower than the content percentage of Fe in the raw powder. The raw powder also contains additive elements other than Fe (e.g., Si and Cr), and oxides of these additive elements are also formed on the surfaces of the soft magnetic metal particles. When the raw powder is heated in an atmosphere containing much oxygen (e.g., the atmosphere), a large amount of Fe oxide is formed from a large amount of Fe contained in the raw powder, and therefore, the content percentage of Fe in the soft magnetic metal particles is lower than that in the raw powder.

By increasing the content percentage of Fe in the soft magnetic metal particles that constitute the magnetic base body, the magnetic saturation characteristics (DC superposition characteristics) of the magnetic base body can be improved. Thus, it is desired to increase the content percentage of Fe in the soft magnetic metal particles. However, in a conventional magnetic base body, the surfaces of the soft magnetic metal particles are covered by the Fe oxide layer produced by oxidizing Fe in the raw powder, so a large amount of Fe in the raw powder is oxidized to form the Fe oxide layer. Therefore, it is difficult to increase the content percentage of Fe in the soft magnetic metal particles.

SUMMARY

It is an object of the present disclosure to solve or alleviate at least part of the drawbacks mentioned above. In particular, one object of the present invention is to provide a method of manufacturing a magnetic base body containing soft magnetic metal particles with a high content percentage of Fe.

Other objects of the disclosure will be made apparent through the entire description in the specification. The inventions recited in the claims may also address any other drawbacks in addition to the above drawback.

A manufacturing method of a magnetic base body according to one embodiment comprises: producing a molded body, the molded body containing a plurality of soft magnetic metal particles at a filling factor of 85% or higher, each of the plurality of soft magnetic metal particles containing Fe and an element A, the element A being more apt to oxidation than Fe; and heating the molded body, so as to form an insulating film on a surface of each of the plurality of soft magnetic metal particles, the insulating film containing an oxide of Fe and an oxide of the element A. A content percentage of Fe in the plurality of soft magnetic metal particles after the heating in the step of heating is higher than a content percentage of Fe in the plurality of soft magnetic metal particles before the heating in the step of heating.

Advantageous Effects

According to the embodiments disclosed herein, it is possible to manufacture a magnetic base body containing soft magnetic metal particles with a high content percentage of Fe.

DESCRIPTION OF THE PREFERRED EMBODIMENTS

Figure 1:
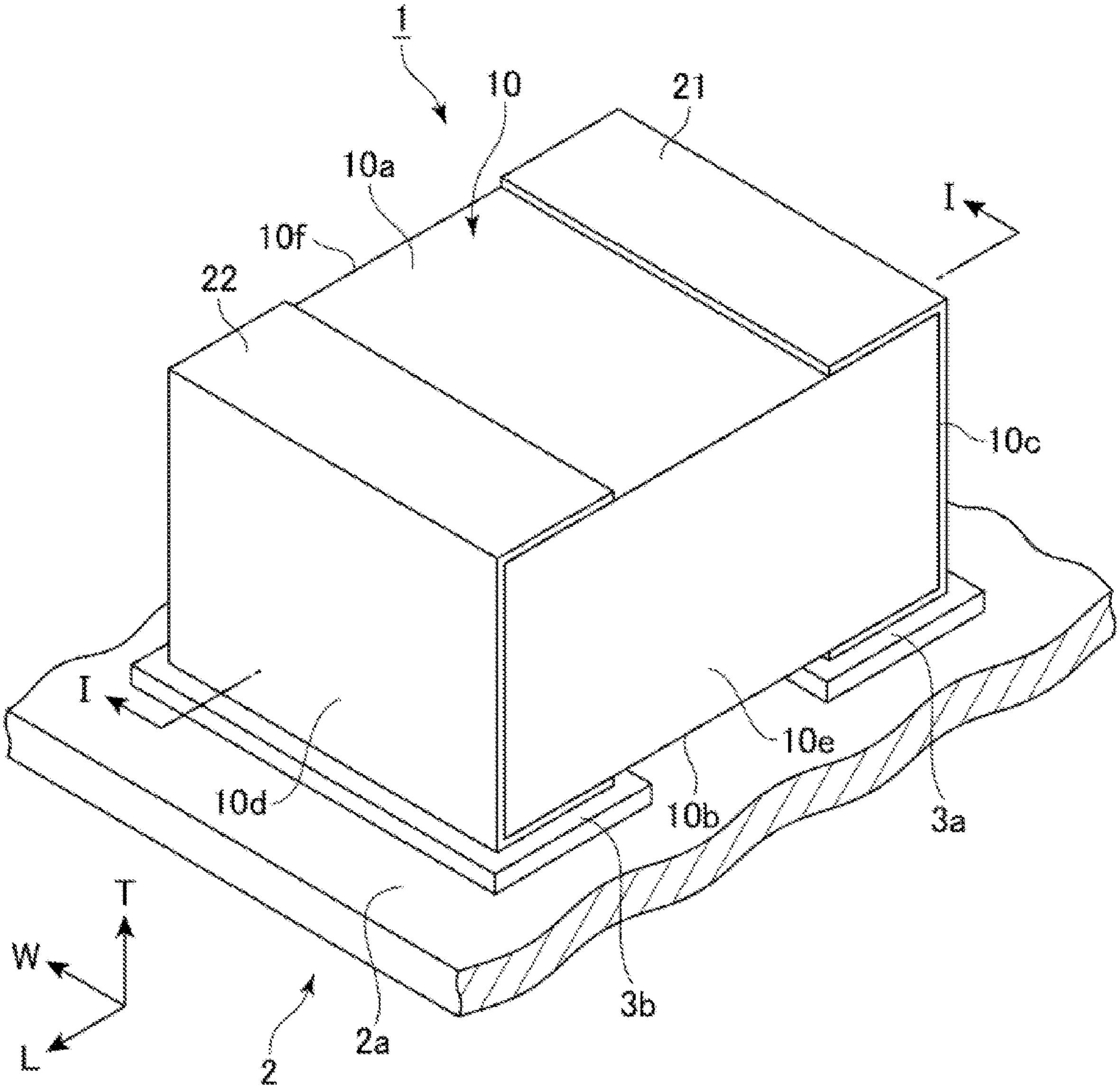
FIG. 1 is a schematic perspective view showing a coil component including a magnetic base body according to one embodiment of the present invention.

Various embodiments of the present invention will be described hereinafter with reference to the appended drawings. Throughout the drawings, the same components are denoted by the same reference numerals. For convenience of explanation, the drawings are not necessarily drawn to scale. The following embodiments of the present invention do not limit the scope of the claims. The elements included in the following embodiments are not necessarily essential to solve the problem addressed by the invention.

One embodiment of the present disclosure relates to a manufacturing method of a magnetic base body included in a coil component. The magnetic base body contains a plurality of soft magnetic metal particles. The following first refers to FIGS. 1 to 6 to describe a coil component 1 including a magnetic base body 10 manufactured by a manufacturing method of a magnetic base body disclosed herein, and then refers to FIG. 7 to describe the manufacturing method of the magnetic base body.

Figure 2:
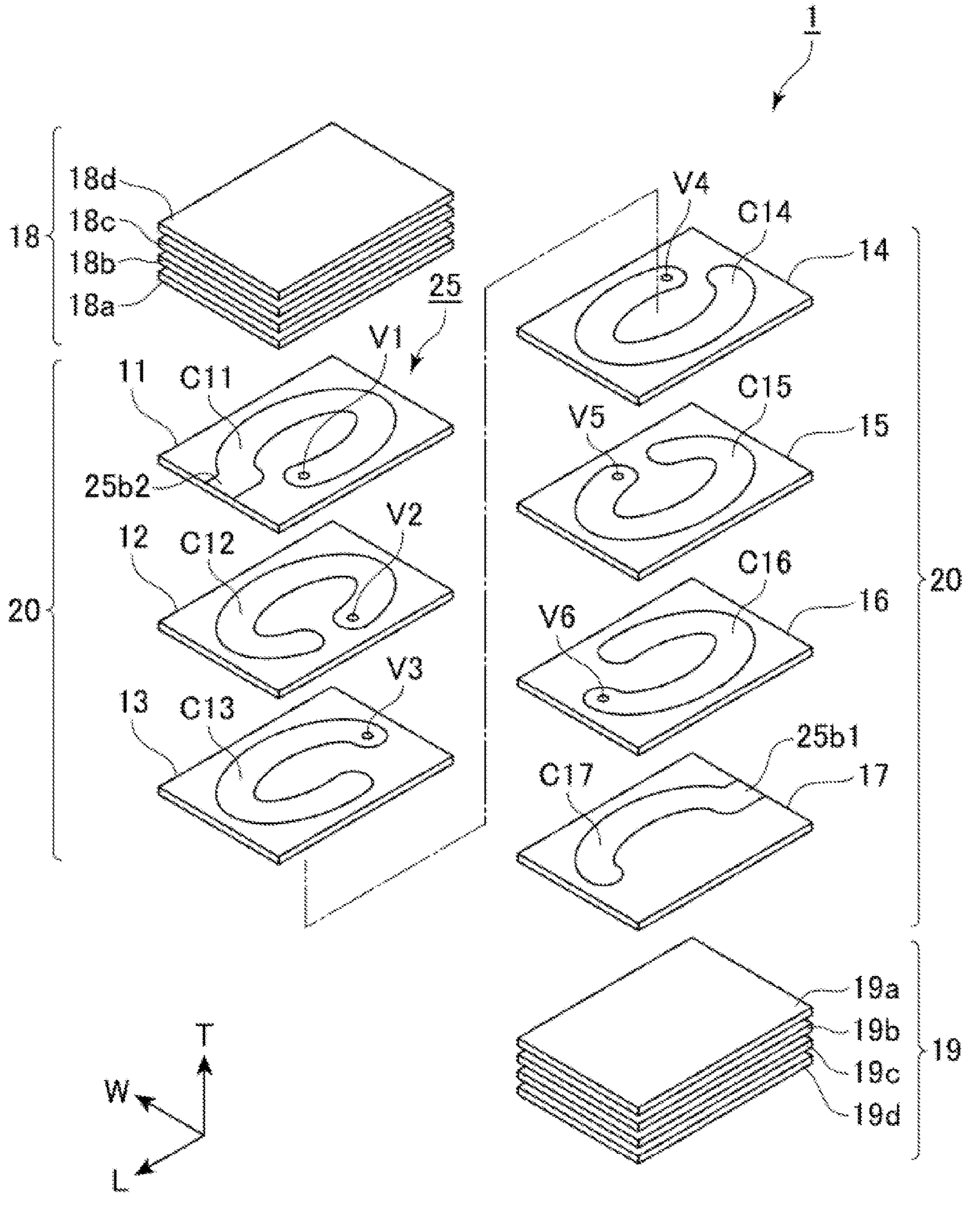
FIG. 2 is an exploded perspective view of the coil component shown in FIG. 1.
Figure 3:
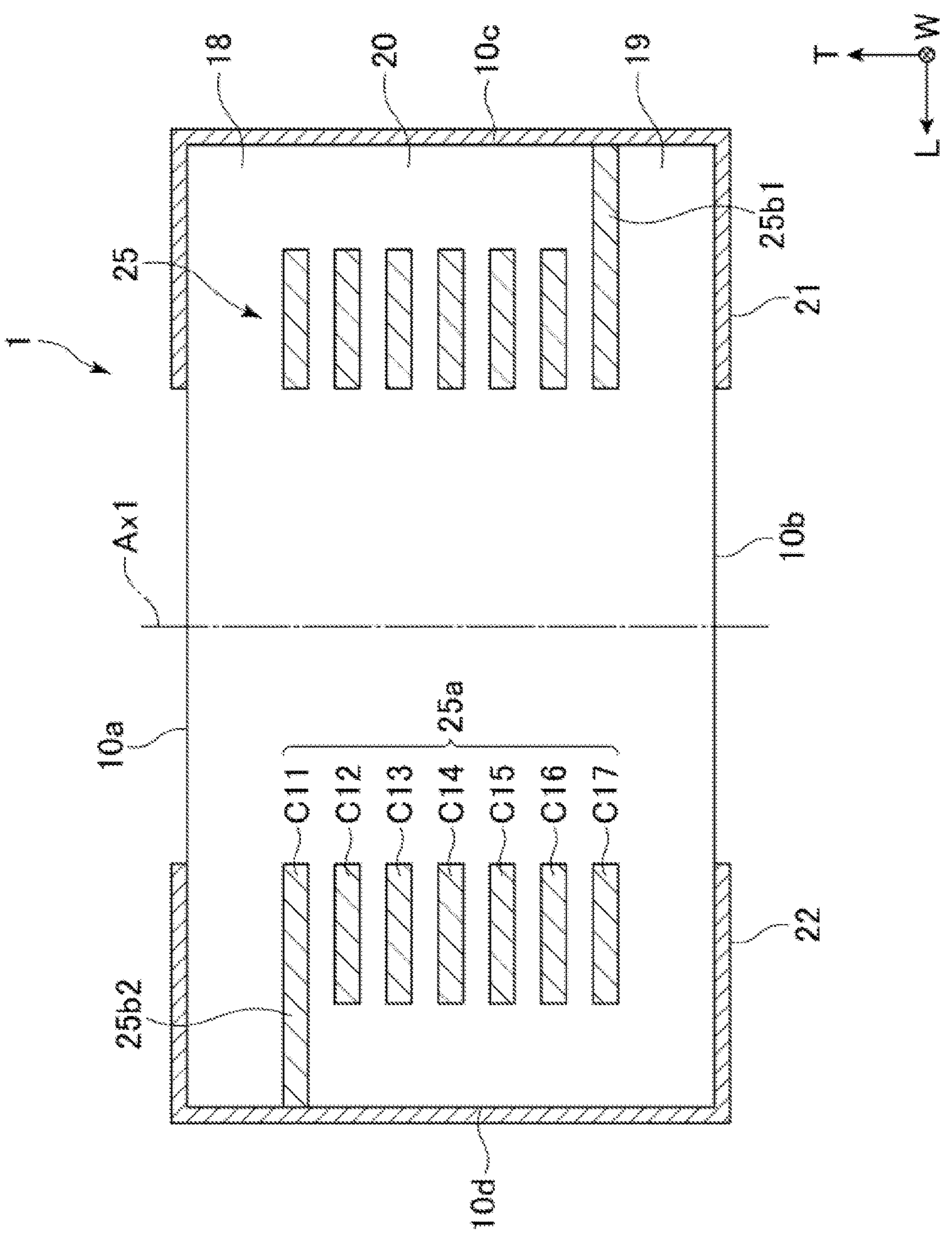
FIG. 3 is a sectional view schematically showing a section of the coil component of FIG. 1 along the line I-I.

FIG. 1 is a schematic perspective view of the coil component 1, and FIG. 2 is an exploded perspective view of the coil component 1. FIG. 3 is a schematic sectional view of the coil component 1 along the line I-I of FIG. 1. In FIG. 2, external electrodes are not shown for convenience of description.

By way of one example of the coil component 1, FIGS. 1 to 3 show a laminated inductor. The laminated inductor shown is an example of the coil component 1 to which the invention can be applied. The invention can also be applied to various coil components other than the laminated inductor. For example, the coil component 1 may be applied to wire-wound coil components or planar coils.

As shown, the coil component 1 includes a base body 10, a coil conductor 25 provided in the base body 10, an external electrode 21 disposed on a surface of the base body 10, and an external electrode 22 disposed on the surface of the base body 10 at a position spaced apart from the external electrode 21. The base body 10 is a magnetic base body made of a magnetic material. The base body 10 is an example of the feature "magnetic base body" recited in the claims.

The base body 10 contains a large number of soft magnetic metal particles. An average particle size of the soft magnetic metal particles contained in the base body 10 is, for example, 1 μm to 20 μm. The average particle diameter of the soft magnetic metal particles contained in the base body 10 is determined as follows. The base body 10 is cut along the thickness direction (T-axis direction) to expose a section, and the section is scanned by a scanning electron microscope (SEM) to take an SEM image at an approximately 10000 to 50000-fold magnification. The SEM image is analyzed to determine the equivalent circle diameter (Heywood diameter) of each soft magnetic metal particle, and the average of the equivalent circle diameters of the soft magnetic metal particles is taken as the average particle diameter of the soft magnetic metal particles. The average particle diameter of the soft magnetic metal particles contained in the base body 10 may be 1 μm to 10 μm or may be 2 μm to 8 μm. Since the average particle diameter of the soft magnetic metal particles does not differ significantly from that of the raw powder, the particle size distribution of the raw powder may be measured by the laser diffraction scattering method according to JIS Z 8825, and the D50 value of the volume-based particle size distribution measured by the laser diffraction scattering method may be taken as the average particle diameter of the soft magnetic metal particles in the base body 10.

The external electrode 21 is electrically connected to one end of the coil conductor 25, and the external electrode 22 is electrically connected to the other end of the coil conductor 25.

The coil component 1 may be mounted on a mounting substrate 2*a*. In the embodiment shown, the mounting substrate 2*a* has lands 3*a* and 3*b* provided thereon. The coil component 1 is mounted on the mounting substrate 2*a* by bonding the external electrode 21 to the land 3*a* and bonding the external electrode 22 to the land 3*b*. A circuit board 2 according to one embodiment of the present invention includes the coil component 1 and the mounting substrate 2*a* having the coil component 1 mounted thereon. The circuit board 2 can be installed in various electronic devices. The electronic devices in which the circuit board 2 can be installed include smartphones, tablets, game consoles, electrical components of automobiles, servers, and various other electronic devices.

The coil component 1 may be an inductor, a transformer, a filter, a reactor, an inductor array and any one of various other coil components. The coil component 1 may alternatively be a coupled inductor, a choke coil, and any one of various other magnetically coupled coil components. Applications of the coil component 1 are not limited to those explicitly described herein.

In the case where the coil component 1 is an inductor array or a magnetically coupled coil component, the coil conductor 25 is constituted by two or more conductor sections. The two or more conductor sections constituting the coil conductor 25 are electrically insulated from each other in the base body 10.

In one embodiment of the present invention, the base body 10 is configured such that the dimension in the L-axis direction (length dimension) is greater than the dimension in the W-axis direction (width dimension) and the dimension in the T-axis direction (height dimension). For example, the length dimension is from 1.0 mm to 6.0 mm, the width dimension is from 0.5 mm to 4.5 mm, and the height dimension is from 0.5 mm to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and the shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the length direction of the base body 10, and the first side surface 10*e* and the second side surface 10*f* are at the opposite ends in the width direction of the base body 10. As shown in FIG. 1, the first principal surface 10*a*, which is at the top of the base body 10, may be herein referred to as a "top surface." Likewise, the second principal surface 10*b* may be herein referred to as a "lower surface" or "bottom surface." Since the coil component 1 is disposed such that the second principal surface 10*b* faces the mounting substrate 2*a*, the second principal surface 10*b* may be herein referred to as "the mounting surface." The top surface 10*a* and the bottom surface 10*b* are separated from each other by a distance equal to the height of the base body 10, the first end surface 10*c* and the second end surface 10*d* are separated from each other by a distance equal to the length of the base body 10, and the first side surface 10*e* and the second side surface 10*f* are separated from each other by a distance equal to the width of the base body 10.

As shown in FIG. 2, the base body 10 includes a body layer 20, a bottom cover layer 19 provided on the bottom-side surface of the body layer 20, and a top cover layer 18 provided on the top-side surface of the body layer 20. The top cover layer 18, bottom cover layer 19, and body layer 20 are the components of the base body 10.

The body layer 20 includes magnetic films 11 to 17. In the body layer 20, the magnetic films 17, 16, 15, 14, 13, 12 and 11 are stacked in the stated order from the negative side toward the positive side in the T-axis direction.

The magnetic films 11 to 17 respectively have conductor patterns C11 to C17 formed on the top-side surface thereof. The conductor patterns C11 to C17 each extend around a coil axis Ax1 (see FIG. 3) within a plane orthogonal to the coil axis Ax1 (the LW plane). The conductor patterns C11 to C17 are formed by, for example, printing a conductive paste made of a highly conductive metal or alloy via screen printing. The conductive paste may be made of Ag, Pd, Cu, Al, or alloys thereof. The conductive paste is produced by mixing and kneading conductive powder made of conductive materials having excellent conductivity, such as Ag, Pd, Cu, Al or alloys of these, with a binder resin and a solvent. The binder resin may be PVB resins, phenolic resins, other resins known as binder resins, or mixtures thereof. When Cu powder is used as the conductive powder, a thermally decomposable resin such as acrylic resin may be used as the binder resin to prevent excessive oxidation of the Cu powder during degreasing. The thermally decomposable resin decomposes without combustion reaction with oxygen. The thermally decomposable resin thermally decomposes in a non-oxygen atmosphere (e.g., nitrogen atmosphere) when the temperature is raised above the thermal decomposition temperature, leaving no residue. Therefore, by using a thermally decomposable resin as the binder resin, the degreasing process can be performed in a non-oxygen atmosphere. Examples of the acrylic resin for the conductive paste include (meth)acrylic acid copolymers, (meth)acrylic acid-(meth)acrylic ester copolymers, styrene-(meth)acrylic acid copolymers, or styrene-(meth)acrylic acid-(meth) acrylic ester copolymers. The solvent may be toluene, ethanol, terpineol, or mixtures of these. The conductive paste may contain modifiers for adjusting thixotropy. The conductor patterns C11 to C17 may be formed using other methods and materials. For example, the conductor patterns C11 to C17 may be formed by sputtering, ink-jetting, or other known methods.

The magnetic films 11 to 16 have vias V1 to V6, respectively, at a predetermined position therein. The vias V1 to V6 are formed by forming through holes at the predetermined positions in the magnetic films 11 to 16 so as to extend through the magnetic films 11 to 16 in the T-axis direction and filling the through holes with a conductive material. Each of the conductor patterns C11 to C17 is electrically connected to the respective adjacent conductor patterns through the vias V1 to V6.

The end of the conductor pattern C11 opposite to the end thereof connected to the via V1 is connected to the external electrode 22. The end of the conductor pattern C17 opposite to the end thereof connected to the via V6 is connected to the external electrode 21.

The top cover layer 18 includes magnetic films 18*a* to 18*d* made of a magnetic material, and the bottom cover layer 19 includes magnetic films 19*a* to 19*d* made of a magnetic material. In this specification of the present invention, the magnetic films 18*a* to 18*d* and the magnetic films 19*a* to 19*d* may be referred to collectively as "the cover layer magnetic films." The components of the base body 10 do not necessarily have a lamination structure with a plurality of magnetic films stacked together. For example, the top cover layer 18 may be a molded body formed of a magnetic material, rather than a laminate including a plurality of magnetic films 18*a* to 18*d* stacked together.

As shown in FIG. 3, the coil conductor 25 includes a winding portion 25*a* wound around the coil axis Ax1 extending along the thickness direction (T-axis direction), a lead-out portion 25*b*1 that extends from one end of the winding portion 25*a* to the first end surface 10*c* of the base body 10, and a lead-out portion 25*b*2 that extends from the other end of the winding portion 25*a* to the second end surface 10*d* of the base body 10. The conductor patterns C11 to C17 and the vias V1 to V6 form the winding portion 25*a* having a spiral shape. In other words, the winding portion 25*a* is constituted by the conductor patterns C11 to C17 and the vias V1 to V6.

Figure 4:
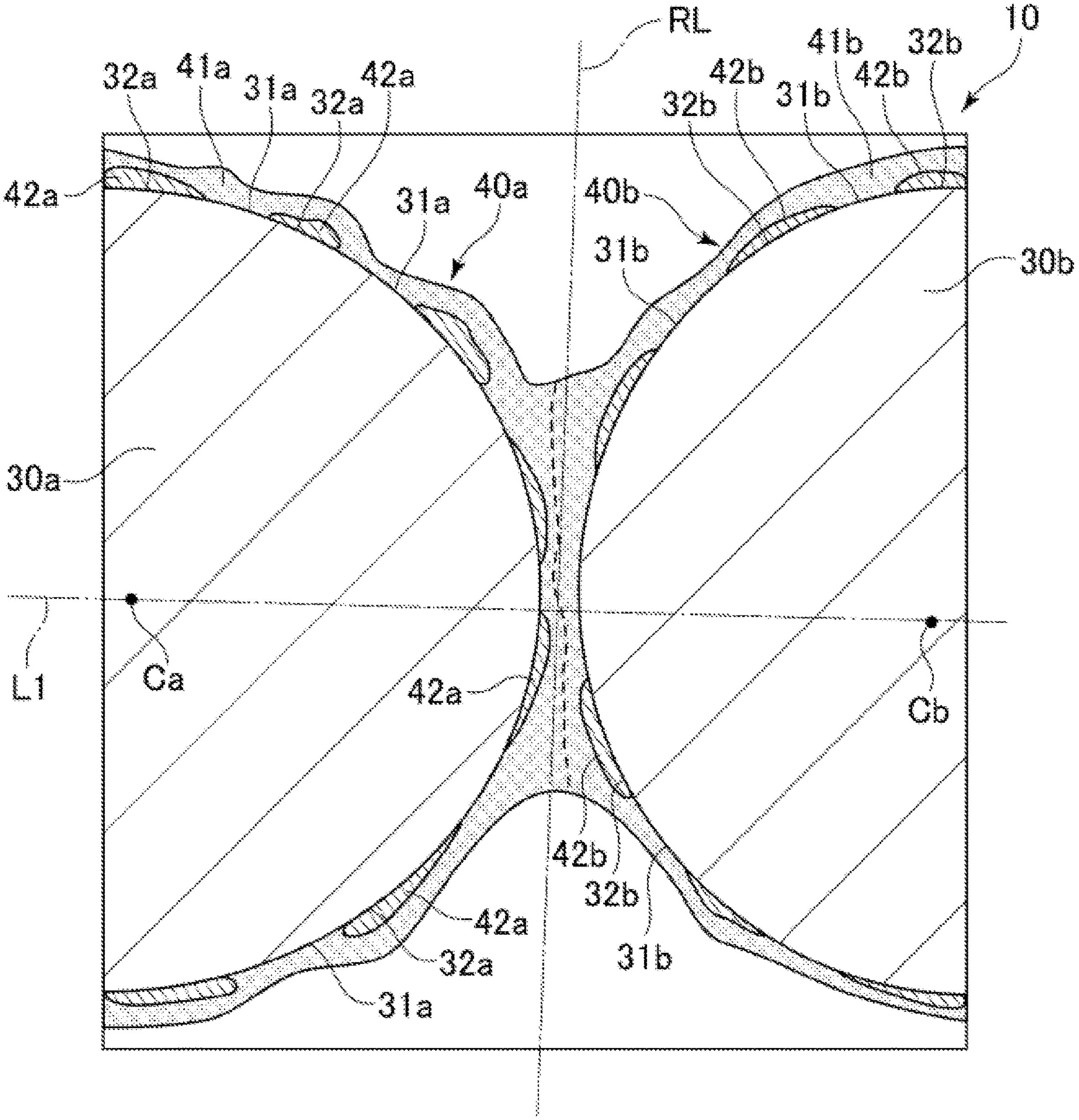
FIG. 4 is an enlarged sectional view schematically showing, on an enlarged scale, a part of a section of the magnetic base body according to one embodiment.

The following now describes the microstructure of the base body 10 with reference to FIG. 4. FIG. 4 is an enlarged sectional view schematically showing, on an enlarged scale, a part of the section shown in FIG. 3. FIG. 4 schematically shows portions of two of the many soft magnetic metal particles in the base body 10.

As shown in FIG. 4, the soft magnetic metal particles contained in the base body 10 include a first soft magnetic metal particle 30*a* and a second soft magnetic metal particle 30*b*. The first soft magnetic metal particle 30*a* and the second soft magnetic metal particle 30*b* are positioned adjacent to each other. In FIG. 4, the sections of the first soft magnetic metal particle 30*a* and the second soft magnetic metal particle 30*b* are drawn to be circular for convenience. The soft magnetic metal particles contained in the base body 10 can take various sectional shapes other than the circular shape. The soft magnetic metal particles contained in the base body 10 are mainly composed of Fe. The first soft magnetic metal particle 30*a* and the second soft magnetic metal particle 30*b* are examples of the soft magnetic metal particles contained in the base body 10. The description regarding the first soft magnetic metal particle 30*a* and the second soft magnetic metal particle 30*b* also applies to soft magnetic metal particles other than the first soft magnetic metal particle 30*a* or the second soft magnetic metal particle 30*b* contained in the base body 10.

The soft magnetic metal particles contained in the base body 10 should preferably contain Fe at a content percentage of 95 wt % or more so that the base body 10 has high magnetic saturation characteristics. The content percentage of Fe in the soft magnetic metal particles contained in the base body 10 is measured by cutting the base body 10 along the coil axis Ax to expose a section of the base body 10 and performing energy dispersive X-ray spectroscopy (EDS) analysis on this section. The content percentage of Fe can be measured by scanning electron microscopy (SEM) equipped with an energy dispersive X-ray spectroscopy (EDS) detector. The EDS analysis by SEM equipped with the EDS detector is called SEM-EDS analysis. The content percentage of Fe is measured, for example, using a scanning electron microscope SU7000 from Hitachi High Tech Corporation and an energy dispersive X-ray spectroscopy detector Octane Elite from Ametek Inc. at an acceleration voltage of 15 kV. The content percentages of elements other than Fe contained in the first soft magnetic metal particle 30*a* are also measured by SEM-EDS analysis, as is the content percentage of Fe.

The surface of each of the soft magnetic metal particles contained in the base body 10 is covered by an insulating film. Thus, the soft magnetic metal particles contained in the base body 10 are electrically insulated from each other. For example, the surface of the first soft magnetic metal particle 30*a* is covered by the first insulating film 40*a*, and the surface of the second soft magnetic metal particle 30*b* is covered by the second insulating film 40*b*. The first insulating film 40*a* should preferably cover the entire surface of the first soft magnetic metal particle 30*a*, and the second insulating film 40*b* should preferably cover the entire surface of the second soft magnetic metal particle 30*b*. In the base body 10, each soft magnetic metal particle is bonded to adjacent soft magnetic metal particles via insulating films provided on their respective surfaces. In other words, the insulating films provided on the surfaces of adjacent soft magnetic metal particles are bonded to each other, and this bonding of the insulating films forms bonding of the soft magnetic metal particles covered by the insulating films. For example, the first soft magnetic metal particle 30*a* is bonded to the second soft magnetic metal particle 30*b* adjacent to the first soft magnetic metal particle 30*a* via the first insulating film 40*a* provided on the surface of the first soft magnetic metal particle 30*a* and the second insulating film 40*b* provided on the surface of the second soft magnetic metal particle 30*b*.

The soft magnetic metal particles contained in the base body 10 are produced, for example, by heating a raw powder made of soft magnetic material. As will be described later, the base body 10 may be fabricated by mixing soft magnetic metal powder made of a soft magnetic material with a resin to produce a mixed resin composition, and then heating the mixed resin composition. The heat treatment in the manufacturing process of the base body 10 causes the elements contained in the raw powder to diffuse to the surface of the raw powder and oxidize on the surface of the raw powder, and as a result, insulating films that contain oxides of the elements contained in the raw powder are formed on the surfaces of the soft magnetic metal particles.

The raw powder for the soft magnetic metal particles contained in the base body 10 is mainly composed of Fe. The raw powder for the soft magnetic metal particles contained in the base body 10 can contain two or more types of additive elements in addition to Fe. For example, the raw powder for the soft magnetic metal particles contained in the base body 10 can contain an element A and an element B as additives in addition to Fe.

The element A and the element B are more apt to oxidation than Fe. The element A may be more apt to oxidation than the element B. The raw powder for the soft magnetic metal particles may contain an element C that is more apt to oxidation than Fe, in addition to the element A and the element B. In one embodiment, the element A is more apt to oxidation than the element B. In one embodiment, the element B is more apt to oxidation than the element C.

The element A includes one or more elements selected from the group consisting of, for example, Al, Ti, Zr, and Mg. In one embodiment, the element A contained in the raw powder may include a single element (e.g., Al). In another embodiment, the element A contained in the raw powder may include a plurality of elements. For example, the element A contained in the raw powder may include Al and Ti.

The element B includes one or more elements selected from the group consisting of, for example, Si, Cr, Mn, Zn, V, Mo, and Nb. In one embodiment, the element B contained in the raw powder may include a single element (e.g., Si). In another embodiment, the element B contained in the raw powder may include a plurality of elements. For example, the element B contained in the raw powder may include Si and Zn.

The element C includes one or more elements selected from the group consisting of, for example, Si, Cr, Mn, Zn, V, Mo, and Nb so as not to overlap with the element B. In one embodiment, the element C contained in the raw powder may include a single element (e.g., Cr). In another embodiment, the element C contained in the raw powder may include a plurality of elements. For example, the element C contained in the raw powder may include Cr and Mo.

Since the elements A, B, and C are all more apt to oxidation than Fe, they are oxidized prior to Fe when the raw powder is heat-treated in an atmosphere containing oxygen. Thus, the presence of the elements A, B, and C in addition to Fe in the raw powder inhibits the oxidation of Fe. The raw powder for the soft magnetic metal particles can contain trace amounts of elements other than Fe and the elements A, B, and C. The elements that can be present in trace amounts in the raw powder for the soft magnetic metal particles may include boron (B), carbon (C), and nickel (Ni).

The insulating films provided on the surfaces of the soft magnetic metal particles contained in the base body 10 contain oxides of the elements contained in the raw powder. The "insulating films provided on the surfaces of the soft magnetic metal particles contained in the base body 10" include the first insulating film 40*a* provided on the surface of the first soft magnetic metal particle 30*a* and the second insulating film 40*b* provided on the surface of the second soft magnetic metal particle 30*b*. For convenience of description, the insulating films provided on the surfaces of the soft magnetic metal particles contained in the base body 10 may be referred to simply as the "insulating films." The elements A and B are more apt to oxidation than Fe. Thus, when the raw powder contains the elements A and B in addition to Fe, the insulating films contain the oxide of the element A and the oxide of the element B. The insulating films may contain an oxide of the element C. The insulating film may also contain oxide of at least one of boron (B), carbon (C), and nickel (Ni), in addition to the above oxides. In one embodiment, the thickness of the insulating film is equal to the distance between the soft magnetic metal particles adjacent to each other. The thickness of the insulating films provided on the surfaces of the soft magnetic metal particles may be an average of distances between adjacent ones of a plurality of soft magnetic metal particles included in an observation region within a section of the base body 10 observed with a predetermined magnification (e.g., 5000-fold magnification). The thickness of the insulating film is, for example, 5 to 20 nm. The thickness of the insulating film need not be uniform along the circumferential direction of the soft magnetic metal particles. In other words, the insulating film may have different thicknesses at different locations in the circumferential direction of the soft magnetic metal particle. If the insulating film has different thicknesses in accordance with the location in the circumferential direction of the soft magnetic metal particle, the average of the different thicknesses can be taken as the thickness of the insulating film. The thickness of the thinnest portion of the insulating film may be smaller than 5 nm. The thickness of the thickest portion of the insulating film may be larger than 20 nm. If the insulating film has different thicknesses in accordance with the location in the circumferential direction of the soft magnetic metal particle, its largest thickness is smaller than ten times its smallest thickness.

With reference to FIG. 4, a further description is given of the insulating films covering the surfaces of the soft magnetic metal particles. As shown in FIG. 4, the first insulating film 40*a* includes a first oxide region 41*a* and a second oxide region 42*a*. The first oxide region 41*a* covers a first surface region 31*a* constituting a part of the surface of the first soft magnetic metal particle 30*a* and contains an oxide of the element A as a main component. The second oxide region 42*a* covers a second surface region 32*a* constituting a part of the surface of the first soft magnetic metal particle 30*a* and contains an oxide of the element B as a main component.

When the element A is Al, the first oxide region 41*a* contains alumina ($Al_2O_3$) as the main component. In the case where the EDS analysis shows that the amount of Al element (atomic percentage (at %) of Al element) is the largest among those of the elements other than oxygen contained in the first oxide region 41*a*, it can be determined that the first oxide region 41*a* contains alumina as the main component. Since the first oxide region 41*a* is mainly composed of alumina, which is insulating, the first oxide region 41*a* has a high insulating quality. In the case where the first oxide region 41*a* may contain an oxide of aluminum other than alumina (e.g., aluminum oxide (II)), the Raman spectroscopic analysis may be performed to determine that the oxide contained as the main component in the first oxide region 41*a* is alumina (aluminum oxide (III)) rather than aluminum oxide (II).

When the element B is Si, the second oxide region 42*a* contains silica ($SiO_2$) as the main component. In the case where the EDS analysis shows that the amount of Si element (atomic percentage (at %) of Si element) is the largest among those of the elements other than oxygen contained in the second oxide region 42*a*, it can be determined that the second oxide region 42*a* contains silica as the main component. Since the second oxide region 42*a* is mainly composed of silica, which is insulating, the second oxide region 42*a* has a high insulating quality. In the case where the second oxide region 42*a* may contain an oxide of silicon other than silica (e.g., silicon monoxide), the Raman spectroscopic analysis may be performed to determine that the oxide contained as the main component in the second oxide region 42*a* is silica (silicon dioxide) rather than silicon monoxide.

The insulating film may contain nitrides of the elements contained in the raw powder in addition to oxides of the elements. The percentage of oxides in the insulating film (on a mass basis) is greater than the percentage of nitrides in the insulating film. The nitrides contained in the insulating film may include aluminum nitride and silicon nitride. The presence of the nitrides of the elements contained in the raw powder in the insulating film inhibits excessive oxidation of the elements contained in the raw powder. In general, oxides have higher hardness than nitrides, so the presence of a larger amount of oxides than nitrides in the insulating film can increase the mechanical strength of the base body 10.

The surface of the first soft magnetic metal particle 30*a* is partitioned into the first surface region 31*a* and the second surface region 32*a*. Since the first surface region 31*a* of the surface of the first soft magnetic metal particle 30*a* is covered by the first oxide region 41*a*, and the second surface region 32*a* is covered by the second oxide region 42*a*, the entire surface of the first soft magnetic metal particle 30*a* is covered by the first and second oxide regions 41*a* and 42*a* each having a high insulating quality.

The first oxide region 41*a* may cover at least a part of the outer surface of the second oxide region 42*a*, in addition to the first surface region 31*a* of the first soft magnetic metal particle 30*a*. The first oxide region 41*a* covering the outer surface of the second oxide region 42*a* can cover any portion of the second oxide region 42*a* having a defect, thereby preventing dielectric breakdown from occurring from the defect in the second oxide region 42*a*. In the aspect shown in FIG. 4, the entire outer surface of the second oxide region 42*a* is covered by the first oxide region 41*a*. The first oxide region 41*a* covering the entire outer surface of the second oxide region 42*a* further inhibits dielectric breakdown.

It is also possible that the first oxide region 41*a* covers only a part of the outer surface of the second oxide region 42*a*. In this case, the amount of the first oxide region 41*a* on the surface of the first soft magnetic metal particle 30*a* can be reduced. Therefore, the first oxide region 41*a* covering only a part of the outer surface of the second oxide region 42*a* can improve the filling factor of the soft magnetic metal particles in the base body 10, compared to the aspect in which the first oxide region 41*a* covers the entire outer surface of the second oxide region 42*a*.

In the embodiment shown in FIG. 4, the first insulating film 40*a* includes a plurality of second oxide regions 42*a* that are spaced apart from each other. In this way, the oxide of the element B is not formed in a layer covering the entire surface of the first soft magnetic metal particle 30*a*, but is formed into a plurality of separate second oxide regions 42*a* on the surface of the first soft magnetic metal particle 30*a*. With a trace amount of element B contained in the raw powder, the plurality of second oxide regions 42*a* can be formed discretely on the surface of the first soft magnetic metal particle 30*a*. The amount of the element B contained in the raw powder for forming the plurality of second oxide regions 42*a* discretely on the surface of the first soft magnetic metal particle 30*a* is, for example, 3 wt % or less. The amount of the element B contained in the raw powder may be 1 to 3 wt %. The content percentage of the element A may be 0.5 wt % or less such that the insulating film has a small thickness. The content percentage of the element B in the raw powder may be 1 to 2 wt %. In particular, the content percentage of the element B in the raw powder may be smaller than that of the element A, such that the second oxide regions 42*a* are formed discretely and the insulating film has a small thickness.

A second insulating film 40*b* is provided on the surface of the second soft magnetic metal particle 30*b*, which is positioned adjacent to the first soft magnetic metal particle 30*a*. The second insulating film 40*b* includes a first oxide region 41*b* and a second oxide region 42*b*. The first oxide region 41*b* covers a first surface region 31*b* constituting a part of the surface of the second soft magnetic metal particle 30*b* and contains an oxide of the element A as a main component. The second oxide region 42*b* covers a second surface region 32*b* constituting a part of the surface of the second soft magnetic metal particle 30*b* and contains an oxide of the element B as a main component. The first oxide region 41*b* contains an oxide of the element A as a main component, as does the first oxide region 41*a*. The above description related to the first oxide region 41*a* applies to the first oxide region 41*b*. The second oxide region 42*b* contains an oxide of the element B as a main component, as does the second oxide region 42*a*. The above description related to the second oxide region 42*a* applies to the second oxide region 42*b*.

In FIG. 4, the boundary between the first insulating film 40*a* and the second insulating film 40*b* is shown with a broken line, but the boundary between the first insulating film 40*a* and the second insulating film 40*b* may not be clearly visible when the cross section of the base body 10 is observed. Oxide regions in the region between the first soft magnetic metal particle 30*a* and the second soft magnetic metal particle 30*b* (e.g., oxide regions having an Al oxide as a main component or oxide regions having a Si oxide as a main component) may be included in either the first insulating film 40*a* or the second insulating film 40*b*.

FIG. 4 shows the geometric center Ca of the first soft magnetic metal particle 30*a*, the geometric center Cb of the second soft magnetic metal particle 30*b*, and an imaginary straight line L1 passing through these geometric centers Ca and Cb. Also shown in FIG. 4 is a reference line RL that intersects perpendicularly with the imaginary straight line L1 passing through the geometric centers Ca and Cb and is at an equal distance from the surface of the first soft magnetic metal particle 30*a* and the surface of the second soft magnetic metal particle 30*b*. The distance between the first soft magnetic metal particle 30*a* and the reference line RL refers to the shortest length of a perpendicular line drawn from any point in the surface of the first soft magnetic metal particle 30*a* down to the reference line RL. Likewise, the distance between the second soft magnetic metal particle 30*b* and the reference line RL refers to the shortest length of a perpendicular line drawn from any point in the surface of the second soft magnetic metal particle 30*b* down to the reference line RL. The second insulating film 40*b* is asymmetric to the first insulating film 40*a* with respect to the reference line RL. For example, the second oxide region 42*b* contained in the second insulating film 40*b* is positioned asymmetrically to the second oxide region 42*a* contained in the first insulating film 40*a* with respect to the reference line RL. In the embodiment shown in FIG. 4, observation of the region between the surface of the first soft magnetic metal particle 30*a* and the surface of the second soft magnetic metal particle 30*b* along the straight line L1 reveals the following: for the first soft magnetic metal particle 30*a*, the second oxide region 42*a* is provided on the surface of the first soft magnetic metal particle 30*a*, and the first oxide region 41*a* is provided on the outer side of the second oxide region 42*a*, but for the second soft magnetic metal particle 30*b*, only the first oxide region 41*b* is provided on the surface of the second soft magnetic metal particle 30*b*. In this way, the asymmetry of the first and second insulating films 40*a* and 40*b* with respect to the reference line RL may be confirmed by observing the first and second insulating films 40*a* and 40*b* along the straight line L1.

In the base body 10, the soft magnetic metal particles are covered by the insulating films containing oxides of two types of elements (i.e., the element A and the element B), and thus the base body 10 has an excellent insulating quality. In one embodiment, the soft magnetic metal particles are covered by the insulating films containing oxides of two types of elements, and thus the insulating quality of the base body 10 can be increased. In order to achieve a high insulating quality with an insulating film composed of a single kind of oxide, the entire surfaces of the soft magnetic metal particles must be covered by a layer of this oxide. However, in the manufacturing process of the base body 10, when a molded body of the raw powder is fabricated so as not to reduce the filling factor of the raw powder, the element oxidized during heating of the molded body is not diffused sufficiently, resulting in thin portions of the oxide of this element formed on a part of the surfaces of the soft magnetic metal particles. Such thin portions of the oxide tend to occur between the soft magnetic metal particles. Depending on the filling factor and the heating condition of the molded body, a part of the surfaces of the soft magnetic metal particles may not be covered by the insulating films, such that adjacent ones of the soft magnetic metal particles directly contact with each other, resulting in degraded insulating quality of the magnetic base body. In the base body 10 of the present application, even when the molded body of the raw powder has a high filling factor, the insulating film contains oxides of two different elements, so the surfaces of the soft magnetic metal particles are coated by an insulating film containing oxides of two different elements. Therefore, even if there are regions on the surfaces of the soft magnetic metal particles that are not coated with the oxide of one element, those regions can be coated with the oxide of the other element. Specifically, in the base body 10, the second oxide region 42*a* is formed only on a part of the first soft magnetic metal particle 30*a* (i.e., only on the second surface region 32*a*), while the first oxide region 41*a*, which is mainly composed of the oxide of the element A, covers the other region of the surface of the first soft magnetic metal particle 30*a* (i.e., the first surface region 31*a*). Therefore, the decrease in insulating quality due to exposure of a part of the surface of the first soft magnetic metal particle 30*a* can be inhibited. The soft magnetic metal particles other than the first soft magnetic metal particle 30*a* contained in the base body 10 are also covered by the insulating film containing the oxides of two different elements (i.e., the element A and the element B), and thus the base body 10 can have a high insulating quality.

A description will now be given of the difference between the insulating film provided on the surfaces of the soft magnetic metal particles contained in the base body 10 of the present application (e.g., the first insulating film 40*a*) and the insulating film provided on the surfaces of the conventional soft magnetic metal particles. Conventionally, in the case where the insulating film covering the surfaces of soft magnetic metal particles contains oxides of two or more elements, the insulating film has a layered structure in which the oxide of each element is formed in a layer and these oxide layers are stacked. In other words, the insulating film of the conventional magnetic base body includes a first oxide layer mainly composed of the oxide of a first element and a second oxide layer mainly composed of the oxide of a second element. The first oxide layer covers the entire outer surface of the soft magnetic metal particle, and the second oxide layer covers the entire surface of the first oxide layer. One example of the conventional magnetic base body in which the insulating film has a layered structure is disclosed in Japanese Patent Application Publication No. 2021-158261.

In contrast, in the base body 10 of the present application, the first surface region 31*a* of the surface of the first soft magnetic metal particle 30*a* is covered by the first oxide region 41*a*, and the second surface region 32*a* of the first soft magnetic metal particle 30*a* is covered by the second oxide region 42*a*. Therefore, in the base body 10 to which the present invention is applied, the proportion of the insulating film in the base body 10 can be reduced compared to the conventional magnetic base bodies that have an insulating film with two or more oxide layers stacked together. As a result, the filling factor of the soft magnetic metal particles in the base body 10 can be increased, and thus the magnetic characteristics can be improved compared to conventional magnetic base bodies having an insulating film with two or more oxide layers stacked together.

The surface of each of the soft magnetic metal particles contained in the base body 10 is coated with the oxides of two elements other than Fe. For example, the surface of the first soft magnetic metal particle 30*a* is covered by the first oxide region 41*a* composed mainly of the oxide of the element A and the second oxide region 42*a* composed mainly of the oxide of the element B. The first oxide region 41*a* and the second oxide region 42*a* ensure insulation from the adjacent soft magnetic metal particles. In the base body 10, the surfaces of the soft magnetic metal particles are covered by oxides of two elements other than Fe contained in the raw powder, thus ensuring the insulation between the soft magnetic metal particles without having to oxidize the Fe element contained in the raw powder and cover the surfaces of the soft magnetic metal particles with a layer of Fe oxide. Therefore, in the base body 10, the content percentage of Fe element in the soft magnetic metal particles can be higher, compared to conventional magnetic base bodies in which the surfaces of soft magnetic metal particles are covered by Fe oxide layers. When reference is made herein to the content percentages of Fe, the element A, and the element B, such content percentages mean the content percentages on a mass basis (wt %).

In manufacturing the base body 10, the raw powder is heated, and thus large proportions of the element A and the element B contained in the raw powder are diffused to the surfaces of the raw powder particles and oxidized to form an oxide region (e.g., the first oxide region 41*a*) composed mainly of the oxide of the element A and an oxide region (e.g., the second oxide region 42*a*) composed mainly of the oxide of the element B. In the base body 10, there is no need to form Fe oxide to ensure insulation, so the heat treatment of the raw powder can be performed under such conditions that the element A and the element B are easily oxidized but Fe is hardly oxidized. Therefore, the content percentage of Fe in the soft magnetic metal particles contained in the base body 10 can be higher than the content percentage of Fe in the raw powder.

Figure 5:
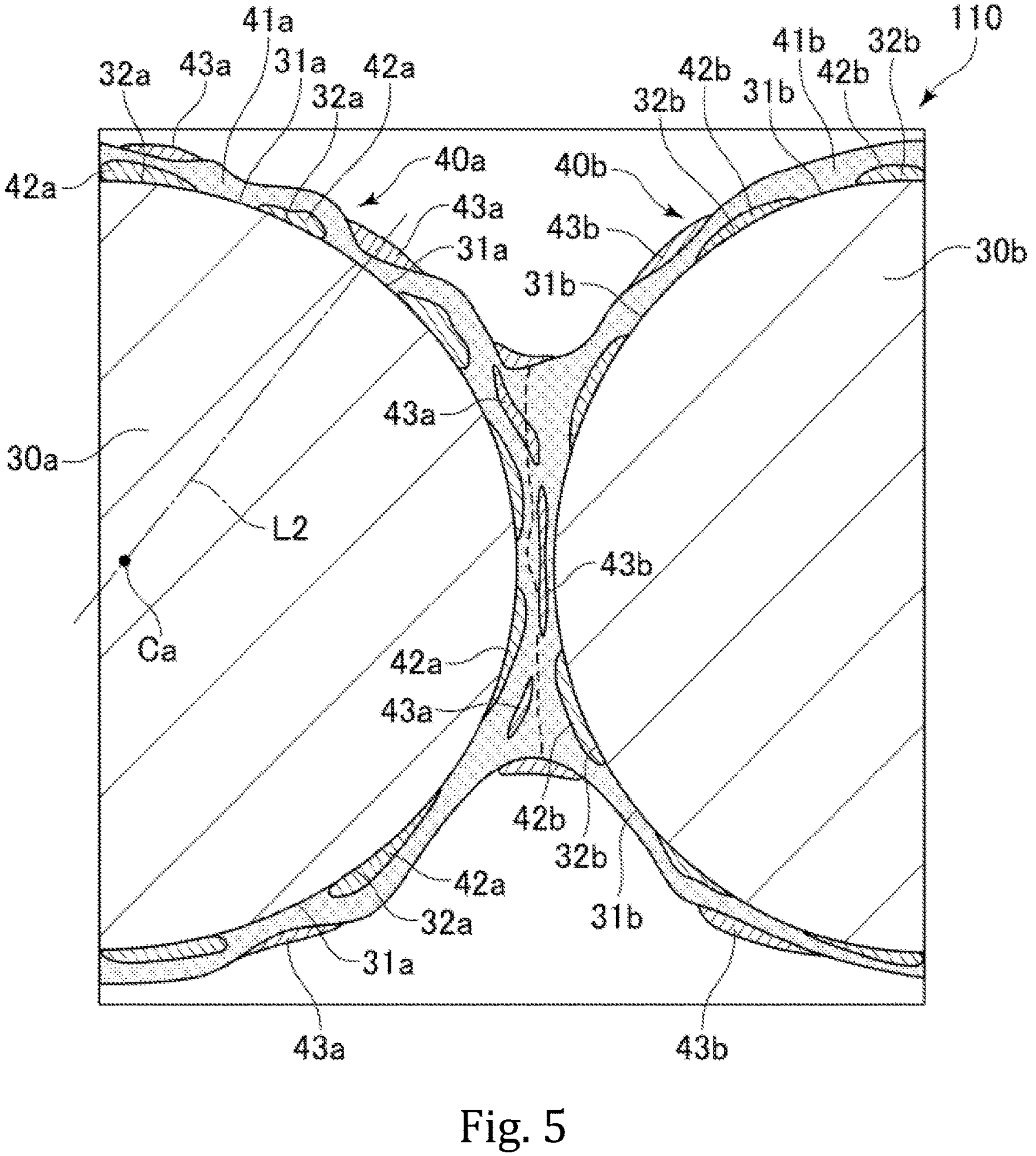
FIG. 5 is an enlarged sectional view schematically showing, on an enlarged scale, a part of a section of the magnetic base body according to another embodiment.

The following describes another embodiment of the base body manufactured by a manufacturing method disclosed herein, with reference to FIG. 5. FIG. 5 is an enlarged sectional view schematically showing a part of a cross section of a base body 110 manufactured by a manufacturing method disclosed herein. The base body 110 shown in FIG. 5 differs from the base body 10 in that the insulating films include a third oxide region that is mainly composed of an oxide of an element C. As shown in FIG. 5, in the base body 110, the first insulating film 40*a* covering the first soft magnetic metal particle 30*a* has a third oxide region 43*a* in addition to the first oxide region 41*a* and the second oxide region 42*a*, and the second insulating film 40*b* covering the second soft magnetic metal particle 30*b* has a third oxide region 43*b* in addition to the first oxide region 41*b* and the second oxide region 42*b*. The first insulating film 40*a* may include a plurality of third oxide regions 43*a* that are spaced apart from each other. The second insulating film 40*b* may include a plurality of third oxide regions 43*b* that are spaced apart from each other.

The third oxide region 43*a* is spaced apart from the surface of the first soft magnetic metal particle 30*a*. In other words, at least one of the first oxide region 41*a* or the second oxide region 42*a* is interposed between the third oxide region 43*a* and the surface of the first soft magnetic metal particle 30*a*. In the embodiment shown, the third oxide region 43*a* is also spaced apart from the second oxide region 42*a*. In other words, the first oxide region 41*a* is interposed between the third oxide region 43*a* and the second oxide region 42*a*. It is also possible that the third oxide region 43*a* is in contact with the second oxide region 42*a*.

The third oxide region 43*a* is located on the outer side of the first oxide region 41*a* in the radial direction of the first soft magnetic metal particle 30*a*. In one embodiment, at least one of a plurality of third oxide regions 43*a* may be provided at a position corresponding to the first surface region 31*a* in the circumferential direction around the first soft magnetic metal particle 30*a*. In other words, at least one of the plurality of third oxide regions 43*a* may be provided on the radially outer side of the first surface region 31*a*. The region corresponding to the first surface region 31*a* in the circumferential direction of the first soft magnetic particle 30*a* contains the first oxide region 41*a* and does not contain the second oxide region 42*a*. On the other hand, the region corresponding to the second surface region 32*a* in the circumferential direction of the first soft magnetic particle 30*a* contains the second oxide region 42*a* and the first oxide region 41*a* provided on the radially outer side thereof. Therefore, the first oxide region 41*a* is concave inwardly at a position corresponding to the first surface region 31*a* in the circumferential direction of the first soft magnetic metal particle 30*a*. In one embodiment, the third oxide region 43*a* is located in a cavity of the first oxide region 41*a* at a position corresponding to the first surface region 31*a* in the circumferential direction of the first soft magnetic metal particle 30*a*. Since the third oxide region 43*a* is provided in the cavity of the first oxide region 41*a*, the thickness of the first insulating film 40*a* can be uniform in the circumferential direction. In the case where a portion of the first insulating film 40*a* is thinner than other portions, dielectric breakdown may occur from the thinner portion. The uniform thickness of the first insulating film 40*a* in the circumferential direction prevents dielectric breakdown from occurring from a thin portion of the first insulating film 40*a*. In the case where the third oxide region 43*a* is provided on the radially outer side of the first surface region 31*a*, the straight line connecting the geometric center Ca of the first soft magnetic metal particle 30*a* and the third oxide region 43*a* provided on the radially outer side of the first surface region 31*a* passes through the first oxide region 41*a* but not through the second oxide region 42*a*.

As with the third oxide region 43*a*, the third oxide region 43*b* is spaced apart from the surface of the second soft magnetic metal particle 30*b*. The third oxide region 43*b* may also be spaced apart from the second oxide region 42*b*. It is also possible that the third oxide region 43*b* is in contact with the second oxide region 42*b*. Further, the third oxide region 43*b* may be located in a cavity of the first oxide region 41*b* at a position corresponding to the first surface region 31*b* in the circumferential direction of the second soft magnetic metal particle 30*b*.

The third oxide regions 43*a* and 43*b* contain an oxide of the element C as a main component. In the case where the element C is Cr, the third oxide regions 43*a* and 43*b* contain chromite ($FeCr_2O_4$) as a main component. When an oxide including Fe is formed in the insulating films covering the Fe-based soft magnetic metal particles, the Fe oxide may be present as hematite ($Fe_2O_3$) or magnetite ($Fe_3O_4$). The mixed presence of hematite, which is non-magnetic, and magnetite, which is ferromagnetic, between soft magnetic metal particles facilitates local magnetic saturation in the region where magnetite is present. With chromite, which is non-magnetic, as a main component of the third oxide region 43*a* containing Fe, the uniformity of magnetic flux between the soft magnetic metal particles can be improved, and as a result, the occurrence of local magnetic saturation between the soft magnetic metal particles can be inhibited. This improves the magnetic saturation characteristics of the base body 110 compared to magnetic base bodies containing more magnetite.

The third oxide regions 43*a* and 43*b* included in the insulating films may contain chromite ($FeCr_2O_4$), hematite ($Fe_2O_3$), and magnetite ($Fe_3O_4$). In one embodiment, in each of the third oxide regions 43*a* and 43*b*, the content percentage of chromite in the total of the aforementioned oxides (the total of chromite, hematite, and magnetite) may be 50% or more. With the content percentage of chromite, which is non-magnetic, being 50% or more, it is possible to reduce the specific permeability of the insulating films and improve the magnetic saturation characteristics of the base body 110, compared to the case with a high content percentage of ferromagnetic oxides (e.g., magnetite). In another embodiment, the sum of the content percentage of chromite and the content percentage of hematite in the total of the aforementioned oxides may be 80% or more. With the sum of the content percentages of chromite and hematite, which are non-magnetic, being 80% or more, it is possible to reduce the specific permeability of the insulating films and improve the magnetic saturation characteristics of the base body 110, compared to the case with a high content percentage of ferromagnetic oxides (e.g., magnetite).

Figure 6:
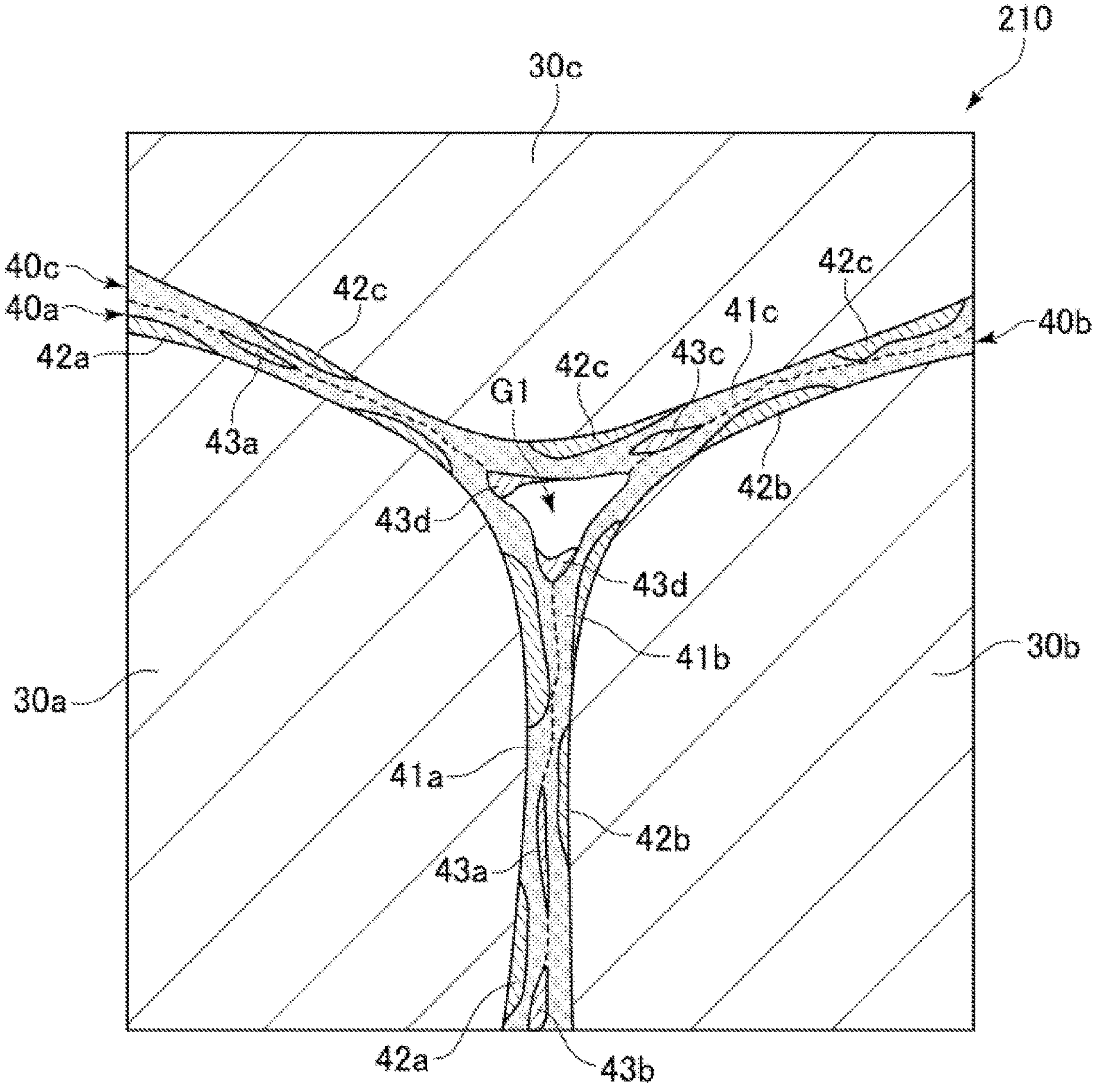
FIG. 6 is an enlarged sectional view schematically showing, on an enlarged scale, a part of a section of the magnetic base body according to still another embodiment.

The following describes another embodiment of the base body manufactured by a manufacturing method disclosed herein, with reference to FIG. 6. FIG. 6 is an enlarged sectional view schematically showing a part of a cross section of a base body 210 manufactured by a manufacturing method disclosed herein. The cross section of the base body 210 shown in FIG. 6 in an enlarged scale is positioned around the boundary of three soft magnetic metal particles. As shown, the base body 210 contains a first soft magnetic metal particle 30*a*, a second soft magnetic metal particle 30*b*, and a third soft magnetic metal particle 30*c*. The first soft magnetic metal particle 30*a*, the second soft magnetic metal particle 30*b*, and the third soft magnetic metal particle 30*c* are positioned adjacent to each other. As mentioned above, the first soft magnetic metal particle 30*a* is covered by the first insulating film 40*a*, and the second soft magnetic metal particle 30*b* is covered by the second insulating film 40*b*. Likewise, the third soft magnetic metal particle 30*c* is covered by the third insulating film 40*c*. The third insulating film 40*c* is configured in the same manner as the first insulating film 40*a* and the second insulating film 40*b*. Specifically, the third insulating film 40*c* includes a first oxide region 41*c*, a second oxide region 42*c*, and a third oxide region 43*c*. The first oxide region 41*c* covers a first surface region 31*c* constituting a part of the surface of the third soft magnetic metal particle 30*c* and contains an oxide of the element A as a main component. The second oxide region 42*c* covers a second surface region 32*c* constituting a part of the surface of the second soft magnetic metal particle 30*c* and contains an oxide of the element B as a main component. The third oxide region 43*c* is spaced apart from the surface of the third soft magnetic metal particle 30*c* and contains an oxide of the element C as a main component. As with the third oxide regions 43*a* and 43*b*, the third oxide region 43*c* may contain chromite as a main component.

In the base body 210, there is a gap among the soft magnetic metal particles that is not filled with the insulating films. For example, as shown in FIG. 6, a gap G1 is present among the first soft magnetic metal particle 30*a*, the second soft magnetic metal particle 30*b*, and the third soft magnetic metal particle 30*c* in the base body 210. At least a part of the gap G1 is defined by a third oxide region 43*d*, which contains an oxide of the element C as a main component. In other words, the third oxide region 43*d* is positioned to face the gap among the soft magnetic metal particles. As with the third oxide regions 43*a* to 43*c*, the third oxide region 43*d* may contain chromite as a main component. In the example shown, the gap G1 is defined by the third oxide region 43*d* and the first oxide regions 41*a* to 41*c*.

In the base body 210, a part of the gap among the soft magnetic metal particles is filled by the third oxide region 43*d*, and thus the mechanical strength of the base body 210 can be improved as compared to the case where the third oxide region 43*d* is not present. When the main component of the third oxide region 43*d* is chromite, a part of the gap is filled by the third oxide region 43*d* mainly composed of chromite having a high hardness, and thus the mechanical strength of the base body 210 can be further improved.

Figure 7:
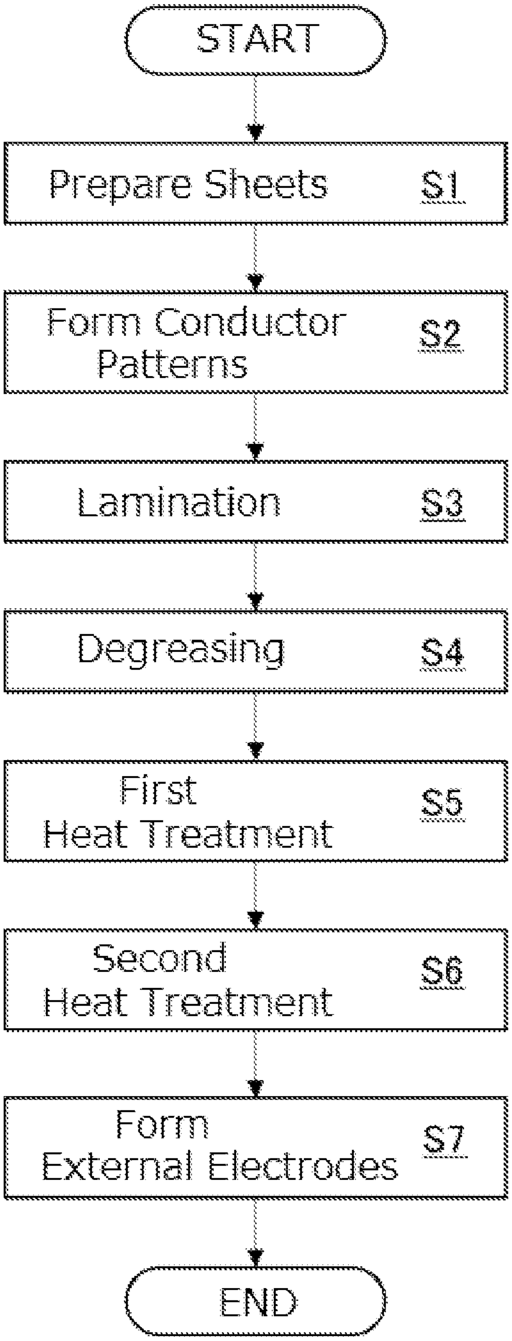
FIG. 7 is a flow chart showing a process of manufacturing a coil component according to one embodiment of the present invention.

Next, one example of a manufacturing method of the base body 10 included in the coil component 1 will be described with reference to FIG. 7. FIG. 7 is a flowchart showing a manufacturing method of the coil component 1 including the base body 10. Since the base body 10 is fabricated in the process of manufacturing the coil component 1, the following describes the manufacturing method of base body 10 according to the process in FIG. 7. In the following, it is assumed that the coil component 1 is manufactured by the sheet lamination method. The coil component 1 may also be manufactured by any known methods other than the sheet lamination method. For example, the coil component 1 may be manufactured by a lamination method such as a printing lamination method, a thin-film process method, or a slurry build method.

In the first step S1, magnetic sheets are fabricated. The magnetic sheets are produced from a magnetic material paste obtained by mixing and kneading soft magnetic metal powder (raw powder), which is the raw material of the soft magnetic metal particles, with a binder resin and a solvent. The raw powder is formed of a soft magnetic metal material. The raw powder contains Fe, the element A, and the element B. In the following description of the manufacturing method, for clarity of description, the raw powder contains Al as the element A and Si as the element B. The raw powder may contain the element C. In the case where the raw powder contains the element C, it is assumed that Cr is used as the element C. The raw powder contains 95 wt % or more Fe. The total of the content percentages of the elements A to C and other additive elements is 5 wt % or less. The raw powder may contain 0.2 to 1 wt % Al. The raw powder may contain 1 to 3 wt % Si. The raw powder may contain 0.5 to 1.5 wt % Cr. The content percentage of Si in the raw powder may be higher than that of Al.

The binder resin for the magnetic material paste is, for example, an acrylic resin. The binder resin for the magnetic material paste may be PVB resins, phenolic resins, other resins known as binder resins, or mixtures thereof. One example of the solvent is toluene. The magnetic material paste is applied to the surface of a plastic base film by the doctor blade method or other common methods. The magnetic material paste applied to the surface of the base film is dried to obtain sheet-shaped molded bodies. A molding pressure of approximately 10 MPa to 100 MPa is applied for molding to the sheet-shaped molded bodies in the mold, so that a plurality of magnetic sheets are obtained.

Next, in step S2, a conductive paste is applied to some of the plurality of magnetic sheets prepared in step S1. The conductive paste is produced by mixing and kneading conductive powder made of conductive materials having excellent conductivity, such as Ag Pd, Cu, Al or alloys of these, with a binder resin and a solvent. The binder resin for the conductive paste may be the same as the binder resin for the magnetic material paste. Both the binder resins for the conductive paste and the magnetic material paste may be acrylic resins.

By applying the conductive paste to the magnetic sheets, unfired conductor patterns to be the conductor patterns C11 to C17 after firing are formed on the associated magnetic sheets. A through hole is formed in some of the magnetic sheets to penetrate the magnetic sheets in the stacking direction. When the conductive paste is applied to a magnetic sheet with a through hole, the conductive paste is also filled into the through hole. In this way, unfired via conductors are formed in the through-holes of the magnetic sheets, and these unfired via conductors will be via conductors V1 to V6 after firing. The conductive paste is applied to the magnetic sheets by, for example, screen printing.

Next, in step S3, the magnetic sheets prepared in step S1 are stacked together to form a top laminate to be the top cover layer 18, an intermediate laminate to be the body layer 20, and a bottom laminate to be the bottom cover layer 19. The top laminate and the bottom laminate are each formed by stacking four magnetic sheets prepared in step S1 and having no unfired conductor pattern formed thereon. The four magnetic sheets of the top laminate will be the magnetic films 18*a* to 18*d* respectively in the finished coil component 1, and the four magnetic sheets of the bottom laminate will be the magnetic films 19*a* to 19*d* respectively in the finished coil component 1. The intermediate laminate is formed by stacking in a predetermined order seven magnetic sheets each having an unfired conductor pattern formed thereon. The seven magnetic sheets of the intermediate laminate will be the magnetic films 11 to 17 respectively in the finished coil component 1. The intermediate laminate formed in the above-described manner is sandwiched between the top laminate on the top side and the bottom laminate on the bottom side, and the top laminate and the bottom laminate are bonded to the intermediate laminate by thermal compression to obtain a body laminate. Next, the body laminate is diced to a desired size by using a cutter such as a dicing machine or a laser processing machine to obtain a chip laminate. The chip laminate is an example of a molded body that includes a substrate body to be the base body 10 after the heat treatment and unfired conductor patterns to be the coil conductor 25 after the heat treatment. The molded body that includes the substrate body to be the base body 10 after the heat treatment and the unfired conductor patterns to be the coil conductor 25 after the heat treatment may be fabricated by a method other than the sheet lamination method.

In the molded body fabricated in step S3, the filling factor of the raw powder is 85% or higher. The filling factor of the raw powder in the molded body is achieved by adjusting the molding pressure for molding the magnetic sheets in accordance with the type of binder resin, the particle size of the raw powder, and other parameters. For example, when using raw powder with an average particle diameter of 4 μm, the raw powder is mixed with 0.5 to 2.0 wt % acrylic resin to produce a magnetic paste, and this magnetic paste is then pressed at a molding pressure of 600 MPa or higher to produce a molded body (magnetic sheet) with a filling factor of the raw powder being 85% or higher. When magnetic sheets are prepared under these conditions, there is little change in the filling factor in step S3 in which the magnetic sheets are stacked to produce the molded body. The filling factor of the raw powder in the molded body can be the proportion of the area occupied by the raw powder to the entire area of the observed field of view in a SEM image of a cross section of the molded body, expressed in percentage.

Next, in step S4, the molded body fabricated in step S3 is degreased. In the case where a thermally decomposable resin is used as the binder resin for the magnetic material paste and the conductive paste, the degreasing process for the molded body may be performed in a non-oxygen atmosphere such as a nitrogen atmosphere. The non-oxygen atmosphere herein refers to an atmosphere with an oxygen concentration of less than 100 ppm. By performing the degreasing process in a non-oxygen atmosphere, the oxidation of Fe contained in the raw powder can be prevented during the degreasing process. The degreasing process is performed at a temperature higher than the thermal decomposition starting temperature of the binder resin for the magnetic material paste. In the case where an acrylic resin is used as the binder resin for the magnetic material paste, the degreasing process is performed at a temperature higher than the thermal decomposition starting temperature of the acrylic resin, e.g., 300° C. to 500° C. Since the degreasing process decomposes the thermally decomposable resin contained in the molded body, no thermally decomposable resin remains in the molded body after the degreasing process is completed. When the binder resin for the conductive paste is the same thermally decomposable resin as the binder resin for the magnetic material paste, the thermally decomposable resin contained in the unfired conductor patterns is also thermally decomposed during the degreasing process in step S4. Thus, in step S4, both the magnetic sheets and the unfired conductor patters constituting the molded body are degreased.

Next, in step S5, the degreased molded body is subjected to first heat treatment. The first heat treatment is performed in a low oxygen concentration atmosphere containing oxygen in a range of 5 to 1000 ppm at a first heating temperature of 750° C. to 900° C. Since the raw powder is heated at 750° C. to 900° C., Al and Si in each raw powder diffuse to the vicinity of the surface by thermal diffusion and combine with oxygen in the atmosphere. In the first heat treatment, oxides of Al and Si, which are easily oxidized, are produced, among the additive elements transferred to the surface of the raw powder. As shown in FIG. 4, the first heat treatment forms an oxide region composed mainly of the oxide of Al (e.g., the first oxide region 41*a*) and an oxide region composed mainly of the oxide of Si (e.g., the second oxide region 42*a*) on the surface of the heated raw powder. The first heating time during which the first heat treatment is performed can be between 1 and 6 hours. The first heating time is, for example, 1 hour.

Next, in step S6, the molded body having been heated in the first heat treatment is subjected to second heat treatment at a higher oxygen concentration than in the first heat treatment. The second heat treatment is preferably performed in a low oxygen atmosphere with an oxygen concentration higher than 1000 ppm and equal to or lower than 10000 ppm, so as to further progress oxidation of Si and Al while inhibiting oxidation of Fe. Since the second heat treatment is performed at a higher oxygen concentration than the first heat treatment, the oxidation of Si and Al is further progressed. As mentioned above, the filling factor of the raw powder in the molded body is as high as 85% or more, so even if the second heat treatment is performed at a higher oxygen concentration than the first heat treatment, not enough oxygen is supplied to the surface of the raw powder to cause excessive oxidation of Fe in the raw powder. Although a small amount of Fe in the raw powder could be oxidized in the second heat treatment, no layer of Fe oxide is formed to cover the surfaces of the raw powder particles.

During the second heat treatment, in addition to oxidation of the raw powder, sintering of the conductive powder in the unsintered conductor patterns also occurs. The coil conductor 25 is obtained by sintering the conductive powder in the unsintered conductor patterns. When copper powder is used as the conductive powder, the copper crystals sinter densely to form the coil conductor 25.

The second heat treatment is performed at a second heating temperature and for a second heating time. The second heating temperature and the second heating time are determined such that insulating films with a sufficient thickness enough to ensure insulation are formed on the surface of the raw powder. The second heating temperature may be, for example, between 500° C. and 700° C. The higher the second heating temperature, the faster the oxidation progresses, so the second heating time depends on the second heating temperature. When the second heating temperature is 500° C., the second heating time may be from one to six hours. When the second heating temperature is 700° C., the second heating time may be from 30 minutes to one hour.

Thus, the raw powder contained in the molded body is oxidized through the first heat treatment and the second heat treatment to produce, from the raw powder, soft magnetic metal particles with a surface covered by an insulating film.

The second heat treatment produces the base body 10 from the molded body. The soft magnetic metal particles contained in the base body 10 may contain 0.0 to 0.5 wt % Al. The soft magnetic metal particles may contain 0.8 to 2.5 wt % Si. The soft magnetic metal particles may contain 0.3 to 1.0 wt % Cr. The content percentage of Si in the raw powder may be higher than that of Al.

Next, in step S7, the external electrode 21 and the external electrode 22 are formed on the surface of the base body 10 obtained in step S6. The external electrode 21 is connected to one end of the coil conductor 25, and the external electrode 22 is connected to the other end of the coil conductor 25. The molded body having gone through the second heat treatment may be impregnated with a resin before the external electrodes 21 and 22 are formed. The molded body is impregnated with, for example, a thermosetting resin such as an epoxy resin. This allows the resin to penetrate the gaps between the soft magnetic metal particles in the base body 10. The resin that has penetrated into the base body 10 may be set to increase the mechanical strength of the base body 10.

The coil component 1 including the base body 10 is fabricated through the steps described above. When SEM-EDS analysis is performed on a cross section of the base body 10 included in the coil component 1 fabricated as described above to measure the mass-based content percentage (wt %) of Fe element in the soft magnetic metal particles, and this content percentage of Fe element in the soft magnetic metal particles is compared to the (mass-based) content percentage of Fe element in the raw powder, it can be confirmed that the content percentage of Fe element in the soft magnetic metal particles is higher than the content percentage of Fe in the metal powder.

In the above manufacturing method, only a very small amount of Fe is oxidized in the first and second heat treatments, and therefore, there are no regions where Fe oxide (iron oxide) is aggregated in the insulating films around the soft magnetic metal particles contained in the base body 10. The absence of aggregated Fe oxide in the insulating films can be determined by SEM-EDS analysis in a cross section of the base body 10. A specific determination method is as follows. First, energy dispersive X-ray analysis (EDS analysis) is performed on a SEM image of a cross section of the base body 10 to obtain mapping data of Fe element and O element, and this mapping data is reconstructed along a scanning line extending across the insulating films. In SEM-EDS analysis, the integrated measurement is performed so that the acquired count of L-line peaks of Fe element in the interior of the soft magnetic metal particles is equal to or greater than 100000 counts. In the mapping data reconstructed along the scanning line, it can be determined that Fe element and O element, which are the quantified elements, are present at the position where the peak intensities of these quantified elements both exceed three times the standard deviation a of the background level. Specifically, since the standard deviation a of the background level is the square root of the background level, it can be determined that the quantified elements are present at the position in the scanning line where the count values of the quantified elements are more than three times the square root of the background level. In this way, the region in the scanning line where both Fe and O elements are detected is identified. When there is no region in the scanning line continuing for 1 nm or more where both Fe and O elements are detected, it can be determined that there is no aggregated Fe oxide in the scanning line. For the first soft magnetic metal particle 30*a* for example, the scanning line is set up to extend from a radially inner-side end to a radially outer-side end of the first insulating film 40*a* along a straight line passing through the geometric center Ca of the first soft magnetic metal particle 30*a*. When it is determined that no aggregated Fe oxide is present in this scanning line, it can be determined that no aggregated Fe oxide is present in the first insulating film 40*a* covering the first soft magnetic metal particle 30*a*. To determine whether or not aggregated Fe oxide is present in the first insulating film 40*a*, it is desirable to set up multiple scanning lines. For example, twelve scanning lines may be set up at 30° intervals around the geometric center Ca of the first soft magnetic metal particle 30*a*. In the case where a plurality of scanning lines are set up for the first soft magnetic metal particle 30*a*, when it is determined for two-thirds or more of the plurality of scanning lines that no aggregated Fe oxide is present, it can be determined that there are no regions where Fe oxide is aggregated in the insulating film 40*a* covering the first soft magnetic metal particle 30*a*. Even when the presence of regions where Fe oxide is aggregated is observed in fewer than one-third of the scanning lines, it is still a small amount relative to the amount of the oxide present in the entire first insulating film 40*a*.

When manufacturing the coil component 1 including the base body 110, the raw powder used in the manufacturing method shown in FIG. 7 contains Cr, in addition to Fe, the element A, and the element B. When the raw powder containing Cr is used, Cr is also diffused to the vicinity of the surface of the raw powder in the first heat treatment in step S5. In the second heat treatment in step S6, Cr diffused to the vicinity of the surface is combined with magnetite, which has been produced in the first heat treatment, to form chromite ($FeCr_2O_4$). Thus, in the case where the raw powder contains Cr, in the second heat treatment in step S6, the first insulating film 40*a* is produced so as to include the third oxide region 43*a* containing chromite as a main component, and the second insulating film 40*b* is produced so as to include the third oxide region 43*b* containing chromite as a main component, as shown in FIG. 5. In this way, in the case where the raw powder contains Cr, an oxide region composed mainly of chromite is produced in the insulating films covering the soft magnetic metal particles, and adjacent soft magnetic metal particles are bonded to each other via the insulating films to produce the base body 110. The base body 210 is produced by the same method as the base body 110.

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," "third" and so on used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

This specification also discloses the following embodiments.

Additional Embodiment 1

A manufacturing method of a magnetic base body, comprising the steps of:

producing a molded body, the molded body containing a plurality of soft magnetic metal particles, each of the plurality of soft magnetic metal particles containing Fe and an element A, the element A being more apt to oxidation than Fe; and heating the molded body, so as to form an insulating film on a surface of each of the plurality of soft magnetic metal particles, the insulating film containing an oxide of Fe and an oxide of the element A, wherein a content percentage of Fe in the plurality of soft magnetic metal particles after the heating in the step of heating is higher than a content percentage of Fe in the plurality of soft magnetic metal particles before the heating in the step of heating.

Additional Embodiment 2

The manufacturing method of Additional Embodiment 1, wherein the content percentage of Fe in the plurality of soft magnetic metal particles after the heating in the step of heating is 95 wt % or higher.

Additional Embodiment 3

The manufacturing method of Additional Embodiment 1 or 2, wherein the element A is at least one of Al or Ti.

Additional Embodiment 4

The manufacturing method of any one of Additional Embodiments 1 to 3, wherein each of the plurality of soft magnetic metal particles further contains an element B which is more apt to oxidation than Fe, and wherein the insulating film contains an oxide of the element B.

Additional Embodiment 5

The manufacturing method of Additional Embodiment 4, wherein the insulating film includes a first oxide region and a second oxide region, the first oxide region containing the oxide of the element A as a main component and covering a first surface region constituting a part of the surface of each of the plurality of soft magnetic metal particles, the second oxide region containing the oxide of the element B as a main component and covering a second surface region of the surface of each of the plurality of soft magnetic metal particles different from the first surface region.

Additional Embodiment 6

The manufacturing method of Additional Embodiment 4 or 5, wherein the element B is Si.

Additional Embodiment 7

The manufacturing method of any one of Additional Embodiments 4 to 6, wherein each of the plurality of soft magnetic metal particles further contains an element C which is more apt to oxidation than Fe, and wherein the insulating film contains an oxide of the element C.

Additional Embodiment 8

The manufacturing method of Additional Embodiment 7, wherein the insulating film further includes a third oxide region containing the oxide of the element C as a main component.

Additional Embodiment 9

The manufacturing method of Additional Embodiment 8, wherein the third oxide region contains $FeCr_2O_4$ as a main component.

Additional Embodiment 10

The manufacturing method of Additional Embodiment 8 or 9, wherein the third oxide region is located on a radially outer side of the first oxide region.

Additional Embodiment 11

The manufacturing method of any one of Additional Embodiments 8 to 10, wherein the third oxide region is located on a radially outer side of the first surface region.

Additional Embodiment 12

The manufacturing method of any one of Additional Embodiments 8 to 11, wherein the third oxide region includes a plurality of unitary third oxide regions spaced apart from each other.

Additional Embodiment 13

The manufacturing method of Additional Embodiment 7, wherein the element C is Cr or Mn.

What is claimed is:

1. A manufacturing method of a magnetic base body, comprising the steps of:

producing a molded body, the molded body containing a plurality of soft magnetic metal particles at a filling factor of 85% or higher, each of the plurality of soft magnetic metal particles containing Fe and an element A, the element A being more apt to oxidation than Fe; and heating the molded body so as to form an insulating film on a surface of each of the plurality of soft magnetic metal particles, the insulating film containing an oxide of Fe and an oxide of the element A, the element A contained in each of the plurality of soft magnetic metal particles thermally diffusing to a surface thereof and being oxidized during the heating, wherein a content percentage of Fe in the plurality of soft magnetic metal particles after the heating in the step of heating is higher than a content percentage of Fe in the plurality of soft magnetic metal particles before the heating in the step of heating.

2. The manufacturing method of claim 1, wherein the content percentage of Fe in the plurality of soft magnetic metal particles after the heating in the step of heating is 95 wt % or higher.

3. The manufacturing method of claim 1, wherein the element A is at least one of Al or Ti.

4. The manufacturing method of claim 1, wherein each of the plurality of soft magnetic metal particles further contains an element B which is more apt to oxidation than Fe, and wherein the insulating film contains an oxide of the element B.

5. The manufacturing method of claim 4, wherein the insulating film includes a first oxide region and a second oxide region, the first oxide region containing the oxide of the element A as a main component and covering a first surface region constituting a part of the surface of each of the plurality of soft magnetic metal particles, the second oxide region containing the oxide of the element B as a main component and covering a second surface region of the surface of each of the plurality of soft magnetic metal particles different from the first surface region.

6. The manufacturing method of claim 4, wherein the element B is Si.

7. The manufacturing method of claim 5, wherein each of the plurality of soft magnetic metal particles further contains an element C which is more apt to oxidation than Fe, and wherein the insulating film contains an oxide of the element C.

8. The manufacturing method of claim 7, wherein the insulating film further includes a third oxide region containing the oxide of the element C as a main component.

9. The manufacturing method of claim 8, wherein the third oxide region contains $FeCr_2O_4$ as a main component.

10. The manufacturing method of claim 8, wherein the third oxide region is located on a radially outer side of the first oxide region.

11. The manufacturing method of claim 8, wherein the third oxide region is located on a radially outer side of the first surface region.

12. The manufacturing method of claim 8, wherein the third oxide region includes a plurality of unitary third oxide regions spaced apart from each other.

13. The manufacturing method of claim 7, wherein the element C is Cr or Mn.

14. The manufacturing method of claim 1, wherein the filling factor of 85% or higher of the molded body limits supply of oxygen into the molded body during the heating, thereby suppressing oxidation of Fe in the plurality of soft magnetic metal particles while the element A diffuses to the surface of the plurality of soft magnetic metal particles and is oxidized to form the insulating film.

* * * * *